(12) United States Patent
Wild et al.

(10) Patent No.: US 10,838,604 B2
(45) Date of Patent: Nov. 17, 2020

(54) USER INTERFACE AND METHOD FOR THE HYBRID USE OF A DISPLAY UNIT OF A TRANSPORTATION MEANS

(71) Applicant: VOLKSWAGEN AG, Wolfsburg (DE)

(72) Inventors: Holger Wild, Berlin (DE); Nils Kötter, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 15/538,839

(22) PCT Filed: Dec. 18, 2015

(86) PCT No.: PCT/EP2015/080523
§ 371 (c)(1),
(2) Date: Jun. 22, 2017

(87) PCT Pub. No.: WO2016/107760
PCT Pub. Date: Jul. 7, 2016

(65) Prior Publication Data
US 2018/0024733 A1    Jan. 25, 2018

(30) Foreign Application Priority Data

Jan. 2, 2015  (EP) .................. EP15150033

(51) Int. Cl.
*B60K 35/00*      (2006.01)
*G06F 3/0484*     (2013.01)
(Continued)

(52) U.S. Cl.
CPC .......... *G06F 3/04847* (2013.01); *B60K 35/00* (2013.01); *B60K 37/06* (2013.01);
(Continued)

(58) Field of Classification Search
CPC ............. B60K 35/00; B60K 2370/115; B60K 2370/141; B60K 2370/1438;
(Continued)

(56) References Cited

U.S. PATENT DOCUMENTS 9,632,584 B2 *   4/2017  Dodge ................ G06F 3/04883
9,857,193 B2 *   1/2018  Vulcano ............. G01C 21/3679
(Continued)

FOREIGN PATENT DOCUMENTS

CN     102150114 A    8/2011
CN     102421624 A    4/2012
(Continued)

OTHER PUBLICATIONS

PCT International Search Report and Written Opinion completed by the ISA/EP dated Apr. 8, 2016 and issued in connection with PCT/EP2015/0805232.
(Continued)

*Primary Examiner* — Justin S Lee
(74) *Attorney, Agent, or Firm* — Barnes & Thornburg LLP

(57) ABSTRACT

Disclosed are a user interface, a computer program product, a signal sequence, a transportation vehicle and a method for the multiple use of a display unit of a user interface included in a transportation vehicle. Said method may comprise the steps: displaying, on a first display unit, display elements representing a range of information; detecting the approach of a user, and in response thereto, displaying control elements representing a range of functions in place of the display elements.

14 Claims, 7 Drawing Sheets

(51) Int. Cl.
  *G06F 3/01* (2006.01)
  *G06F 3/0488* (2013.01)
  *G06F 3/03* (2006.01)
  *B60K 37/06* (2006.01)
  *G06F 1/3234* (2019.01)

(52) U.S. Cl.
  CPC ............ *G06F 3/017* (2013.01); *G06F 3/0304* (2013.01); *G06F 3/04886* (2013.01); *B60K 2370/11* (2019.05); *B60K 2370/111* (2019.05); *B60K 2370/122* (2019.05); *B60K 2370/141* (2019.05); *B60K 2370/1438* (2019.05); *B60K 2370/1442* (2019.05); *G06F 1/3265* (2013.01)

(58) Field of Classification Search
  CPC .......... B60K 2370/11; B60K 2370/113; B60K 2370/119; B60K 2370/122; B60K 2370/143; B60K 2370/184; B60K 2370/741
  See application file for complete search history.

(56) References Cited

U.S. PATENT DOCUMENTS

| | | | | |
|---|---|---|---|---|
| 9,975,427 | B2* | 5/2018 | Hisatsugu | B60K 35/00 |
| 2009/0077504 | A1* | 3/2009 | Bell | G06F 3/011 |
| | | | | 715/863 |
| 2009/0132130 | A1* | 5/2009 | Kumon | B60K 35/00 |
| | | | | 701/49 |
| 2010/0214238 | A1* | 8/2010 | Christoph | B60K 35/00 |
| | | | | 345/173 |
| 2011/0082616 | A1* | 4/2011 | Small | B60K 35/00 |
| | | | | 701/31.4 |
| 2011/0187675 | A1* | 8/2011 | Nakai | G06F 3/044 |
| | | | | 345/174 |
| 2012/0072103 | A1* | 3/2012 | Backman | B60K 35/00 |
| | | | | 701/400 |
| 2012/0105349 | A1* | 5/2012 | Hauschild | G06F 3/0488 |
| | | | | 345/173 |
| 2013/0044080 | A1* | 2/2013 | Chiang | H04N 13/302 |
| | | | | 345/174 |
| 2013/0076499 | A1* | 3/2013 | Okita | B60K 35/00 |
| | | | | 340/438 |
| 2013/0111403 | A1* | 5/2013 | Nakamura | B60K 35/00 |
| | | | | 715/810 |
| 2014/0096069 | A1* | 4/2014 | Boblett | G06F 3/017 |
| | | | | 715/783 |
| 2014/0123064 | A1* | 5/2014 | Matsumoto | B60K 35/00 |
| | | | | 715/810 |
| 2015/0067574 | A1* | 3/2015 | Okita | G06F 3/0488 |
| | | | | 715/773 |
| 2015/0081167 | A1* | 3/2015 | Pisz | B60H 1/00642 |
| | | | | 701/36 |
| 2015/0138214 | A1* | 5/2015 | Roh | G02B 27/0101 |
| | | | | 345/520 |
| 2015/0217781 | A1* | 8/2015 | Lee | B60W 50/10 |
| | | | | 701/1 |
| 2016/0062507 | A1* | 3/2016 | Suzuki | G06F 3/04883 |
| | | | | 345/174 |
| 2016/0167517 | A1* | 6/2016 | Nishihashi | B60K 37/04 |
| | | | | 345/174 |
| 2016/0288643 | A1* | 10/2016 | Kotter | G06F 3/0488 |

FOREIGN PATENT DOCUMENTS

| | | |
|---|---|---|
| CN | 102574469 A | 7/2012 |
| CN | 103019524 A | 4/2013 |
| CN | 103025561 A | 4/2013 |
| CN | 104220970 A | 12/2014 |
| DE | 102005011094 A1 | 11/2005 |
| DE | 102007039445 A1 | 2/2009 |
| DE | 102009023447 A1 | 1/2010 |
| DE | 102009051202 A1 | 5/2011 |
| DE | 102010055132 A1 | 6/2012 |
| EP | 2808775 A2 | 12/2014 |
| JP | 2000056910 A | 2/2000 |
| JP | 2007076383 A | 3/2007 |
| JP | 2009075656 A | 4/2009 |
| KR | 20130032323 A | 4/2013 |

OTHER PUBLICATIONS

European Search Report and Opinion dated Jul. 6, 2015 and issued in connection with EP Patent Application No. 15150033.7.

Office Action for Korean Patent Application No. 10-2017-7018892; dated Aug. 10, 2018.

Office Action for Chinese Patent Application No. 20580071905.0; dated May 31, 2019.

* cited by examiner

USER INTERFACE AND METHOD FOR THE HYBRID USE OF A DISPLAY UNIT OF A TRANSPORTATION MEANS

CROSS-REFERENCE TO RELATED APPLICATIONS

This application is a national stage entry under 35 USC § 371 of PCT International Application No. PCT/EP2015/080523, filed Dec. 18, 2015, and claims the benefit under 35 USC § 119(e) to European Patent Application Number 15150033.7, filed Jan. 2, 2015.

SUMMARY

Illustrative embodiments of the present disclosure relate to a vehicle, a user interface and a method for the multiple ("hybrid") use of a display unit of a transportation vehicle. In particular, disclosed embodiments relate to a use of a display unit for displaying instruments and operator control elements as a function of an operating state.

BRIEF DESCRIPTIONS OF THE DRAWINGS

Exemplary embodiments of the present disclosure will be described in more detail below with reference to the accompanying drawings, in which.

DETAILED DESCRIPTION OF THE DISCLOSED EMBODIMENTS

Figure 1:
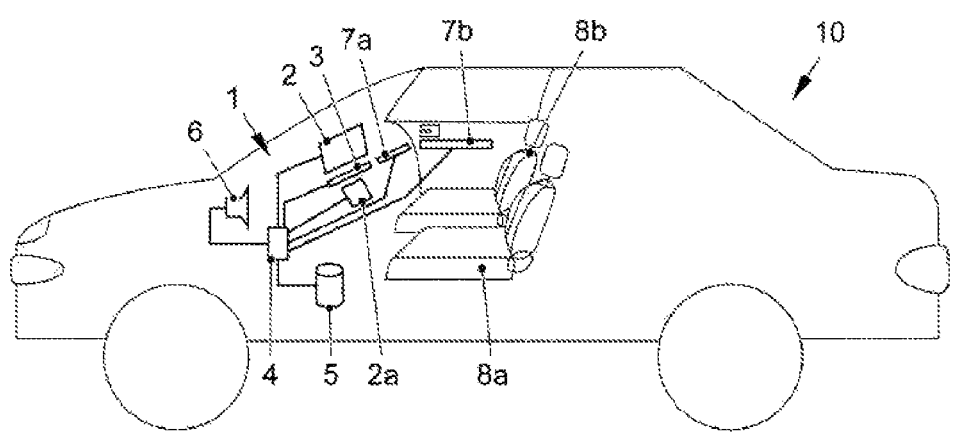
FIG. 1 shows a basic outline illustrating components of an exemplary embodiment of transportation means according to the present disclosure with an exemplary embodiment of a user interface according to the present disclosure.

Gestures for modifying a display unit of a transportation means are disclosed. For example, additional operator control elements which are assigned to a respective tile (window or information unit) on the display unit are displayed as a function of an approach gesture. The user can modify contents of the tile or the appearance of the tile by means of the operator control elements. Furthermore, instruments which are implemented using software and are displayed on a screen of a transportation means in order to display information about the operating state of the vehicle or other data and measured values to any user are disclosed.

An object of the present disclosure is to use a user unit of a transportation means in a flexible way and as a function of the requirements of the user.

The object may be achieved according to the present disclosure by means of a user interface and a method for the hybrid ("multiple") use of a user unit of a transportation vehicle. The user unit can be, for example, a screen on which optional contents can be represented. The transportation vehicle, also referred to herein as transportation means, can be embodied, for example, as a passenger car, as a transporter, as a truck, as an aircraft and/or watercraft. In a first step, a multiplicity of display elements representing a first information scope are displayed on the display unit. The display elements are not expressly configured to receive user inputs and can therefore be understood as "instruments". For example, the display elements can represent a time, a current acceleration of the transportation means, a compass direction, a speed, a load distribution among wheels of the transportation means or the like. In a second step, the approaching of a user to the display unit is detected. This can be done, for example, by means of an infrared LED strip such as is known in the prior art basically for detecting approach gestures. An "approach" is understood within the scope of the present disclosure to be, in particular, such a gesture of the user which occurs completely without contact with a touch-sensitive surface of the display unit. In response to the detected approach gesture, an operator control element or a multiplicity of operator control elements representing functional scopes are displayed instead of the display elements. In other words, the display element or the multiplicity of previously displayed display elements are no longer displayed after the operator control elements have been completely displayed. The information scope which is represented by the display elements is therefore replaced by the functional scope which is represented by the operator control elements. The operator control elements serve, in contrast to the display elements, to receive user interactions which effect a functional scope which is represented by the operator control elements. The operator control elements can be provided, for example, for changing air-conditioning settings and/or seat settings. Therefore, in making an approach the user can use the display unit to influence the functional scope of the operator control elements. In this way, the display unit can be used for different information scopes or functional scopes. This may be an implemented option, in particular, if a user interface of the transportation means is in an operating state in which an additional display unit is currently out of operation.

According to a second aspect of the present disclosure, a user interface for the multiple use of a display unit of a transportation means is proposed. The user interface comprises a display unit which is configured to display elements representing a first information scope. In addition, a detection unit is provided which is configured to detect an approach of a user to the display unit and/or the detection unit. An evaluation unit of the user interface is configured to display, in response to the approaching of the user detected by means of the detection unit, operator control elements of a functional scope instead of the display elements representing the information scope on the display unit. In other words, the user interface according to the present disclosure is configured to execute a method according to the first-mentioned aspect of the present disclosure. The features, combinations of features and technical effects resulting therefrom correspond to what was stated in conjunction with the first-mentioned aspect of the present disclosure so clearly that reference is made to the above statements in order to avoid repetitions.

The dependent claims present optional developments of the presently disclosed embodiments.

The method and the user interface can use or comprise a primary screen or a primary display unit which is configured to be placed in an energy saving mode. The energy saving mode can also be understood to be a dimming mode which the user can, for example, activate optionally. This can provide for for reducing light emissions in the passenger compartment when driving at night. Furthermore, users who are not familiar with modern user interfaces can, by virtue of a reduced display area, experience less anxiety in respect of touching the user interface.

The display unit can preferably be assigned to a primary screen which is in an energy saving mode, or can be placed in an energy saving mode, and is, for example, larger than the display unit of the abovementioned aspects of the present disclosure. When there is a change into an operating mode with a relatively high energy consumption the display elements can be automatically transferred on the primary screen. In other words, when the approaching of a user is detected the display element or the multiplicity of display elements are displayed on the primary screen instead of on the display unit. Alternatively or additionally, after a predefined time period has passed after the removal of the user from the display unit or from the detection unit the display element or the display elements can be removed from the primary screen and represented again on the display unit, and in the process ultimately completely replace the operator control elements.

The information scope of the display elements can be assigned, for example, to other functions of the transportation means than the functional scope of the operator control elements. In other words, a controllable variant of the display elements is not merely shown after an approaching has been detected but instead essentially operator control elements which are independent in this regard of the display elements are displayed. In particular, the user inputs by means of the operator control elements do not affect the information scope represented by the display elements.

The display elements can be, for example, a compass function and/or a temperature display (external temperature and/or passenger compartment temperature, driver's side and/or front seat passenger side, seat heater, air temperature, steering wheel heater, etc.) and/or a load distribution among driven wheels of the transportation means.

The operator control elements can relate to adaptations of heating/air-conditioning functions, for example the passenger compartment temperature (driver's side and/or front seat passenger's side), the seat heater, the air temperature, the steering wheel heater, etc.), but in particular functions which are different from the abovementioned functions apply to the operator control elements.

The operator control elements can comprise, in particular, on/off control buttons and/or incrementation and/or decrementation control buttons and/or slide controllers etc., which relate to functional scopes predefined for the operator control elements.

According to a third aspect of the present disclosure, a computer program product is proposed which comprises instructions which, when executed on an evaluation unit of a user interface according to the invention, cause the user interface to execute the steps of a method as claimed in the first-mentioned aspect of the present disclosure. The computer program product can be equipped as a CD, DVD, Blue Ray disk, Flash memory, hard disk, RAM/ROM, cache, etc.

According to a fourth aspect of the present disclosure, a signal sequence is proposed which represents instructions which, when executed on a programmable evaluation unit of a user interface according to the second-mentioned aspect of the disclosure, cause or enable the user interface to execute the method steps of a method according to the first-mentioned aspect of the present disclosure. In this way, the provision of the information by means of information technology is also placed under protection in the event of the memory means which are necessary for this being outside the scope of validity of the appended claims.

According to a fifth aspect of the present disclosure, a transportation means (e.g. a passenger car, a transporter, a truck, a motorbike, an aircraft and/or watercraft) is proposed which comprises a user interface according to the second-mentioned aspect of the disclosure. The features, combinations of features and the technical effects resulting therefrom of the third-mentioned, fourth-mentioned and fifth-mentioned aspects of the present disclosure arise in a way corresponding to those which were explained in conjunction with the first-mentioned aspect of the invention.

FIG. 1 shows a passenger car 10 as transportation means in which an exemplary embodiment of a user interface 1 which is configured according to the present disclosure is provided. A first screen 2 is arranged as primary screen and a second screen 2a as a display unit underneath the primary screen 2. A finger strip 3 with integrated approach sensor system is provided as a detection unit for receiving approach gestures and swiping gestures between the screens 2, 2a. An electronic control unit 4 is provided as an evaluation unit and is connected by means of information technology to the screens 2, 2a and the finger strip 3 as well as the approach sensor system. Moreover, a data memory 5 and a loudspeaker 6 are connected by means of information technology to the electronic control unit 4. References for approach gestures and/or swiping gestures can be stored in the data memory 5. Acknowledgement tones and/or signal tones and voice signals can be output via the loudspeaker 6. In addition, ambient light strips 7a and 7b are let into the dashboard and/or the doors of the passenger car 10 and can be actuated via the electronic control unit 4 to output light. A driver's seat 8a and a front seat passenger's seat 8b are provided for accommodating a driver or a front seat passenger as a user.

Figure 2:
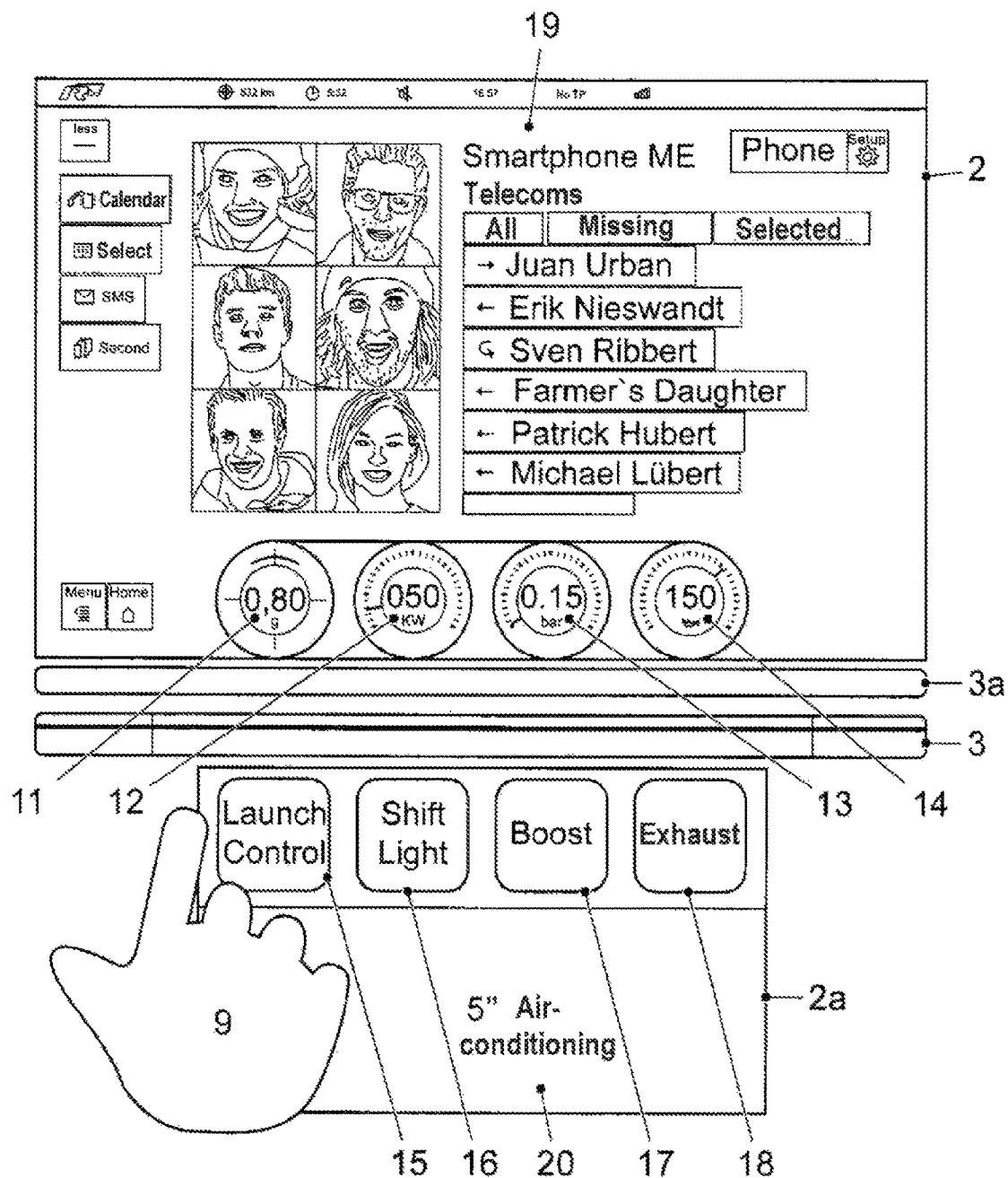
FIG. 2 shows an illustration of a user interaction for activating an idle mode of a user interface.

FIG. 2 shows a possible screen content 19 of a primary screen 2 ("screenshot") on which four display elements 11, 12, 13, 14 representing a current acceleration of the transportation means or a current power output of the transportation means or a charging pressure of an internal combustion engine of the transportation means or a coolant temperature of the transportation means are displayed in a central lower region. An infrared LED strip 3a is provided as a detection unit for detecting approach gestures of a user underneath the primary screen 2. A finger strip 3 is provided as part of the detection unit for receiving wiping gestures of the user is provided underneath the infrared LED strip 3a.

A touch sensitive screen 2a is arranged, as an example of a display unit according to the claims, underneath the finger strip 3. It has a smaller width and a smaller height than the primary screen 2. A touch-sensitive surface (not illustrated) permits contact-forming input by means of a hand 9 of a user with respect to four operator control elements 15, 16, 17, 18 which are provided for activating starting assistance or adaptation of the passenger compartment light or a "boost" function or for activating by means of modifying a background noise produced by an exhaust system of the transportation means. Heating/air-conditioning scopes 20 are displayed underneath the operator control elements 15, 16, 17, 18.

Figure 3:
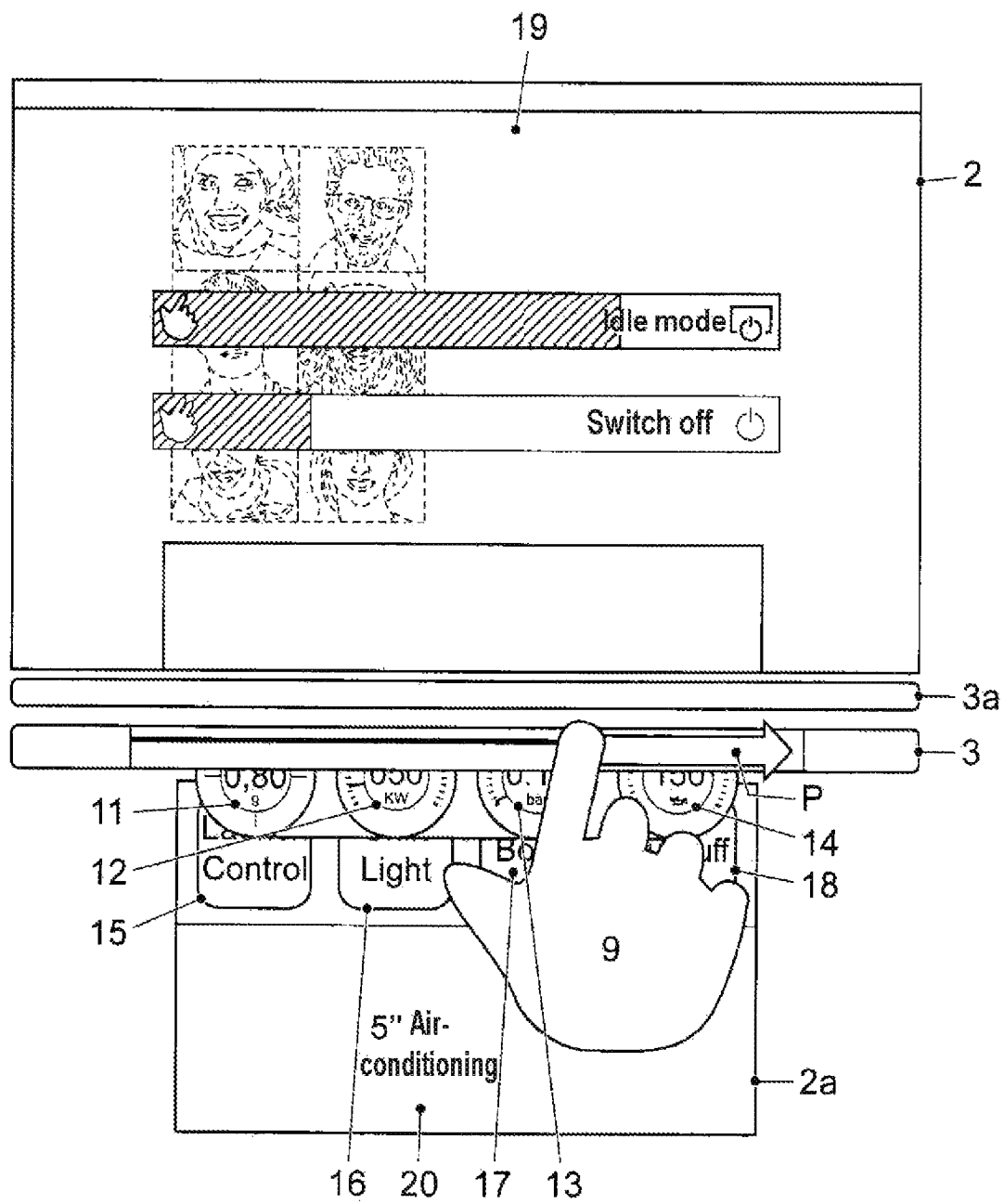
FIG. 3 shows an illustration of a further user interaction for activating the idle mode.

FIG. 3 shows a user gesture for activating an idle mode of the user interface illustrated in FIG. 2. A wiping gesture, assigned to the activation of the idle mode, of the user's hand 9 in the direction of arrow P has a result that the display elements 11, 12, 13, 14 which were previously displayed on the primary screen 2 are no longer displayed on the primary screen 2 but instead descend in a virtual fashion in the direction of the screen 2a. In other words, the display elements 11, 12, 13, 14 are "pushed in" from the top in to the screen content of the screen 2a, during which process they are superimposed on the operator control elements 15, 16, 17, 18 and finally replace them. It remains possible to see and control the air-conditioning operator control region 20 arranged underneath the operator control elements 15, 16, 17, 18, even after the display elements 11, 12, 13, 14 have been pushed in.

Figure 4:
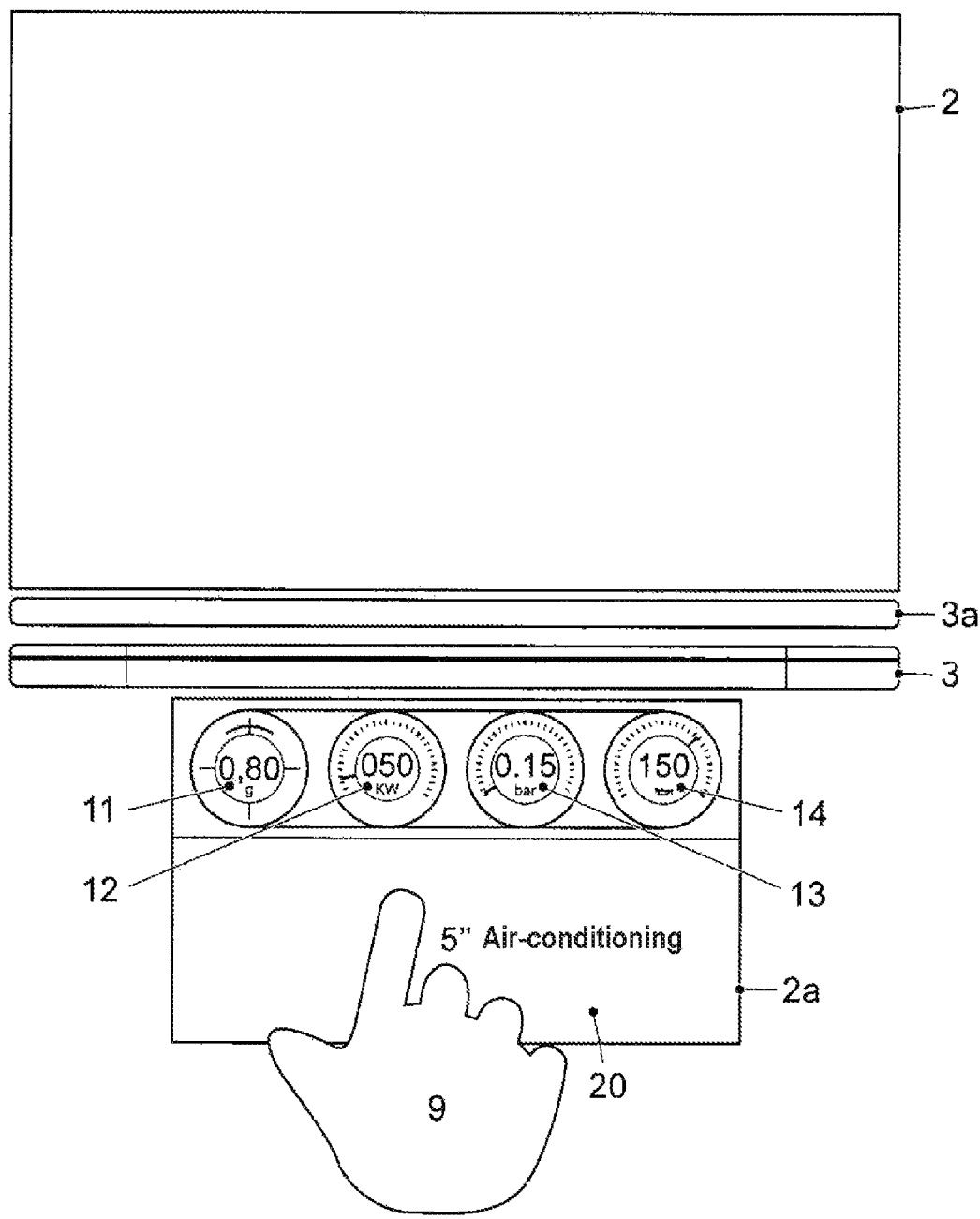
FIG. 4 shows the approaching of a user to a user interface which is in an idle mode and is configured according to the present disclosure.

FIG. 4 shows the result of the successfully activated idle state in which the display elements 11, 12, 13, 14 are completely superimposed on the operator control elements and replace them visually. Renewed approaching of the user with his hand 9 to the infrared LED strip 3a generates the representation shown in FIG. 5 in which the primary screen 2 which is no longer completely dimmed is activated again.

Figure 5:
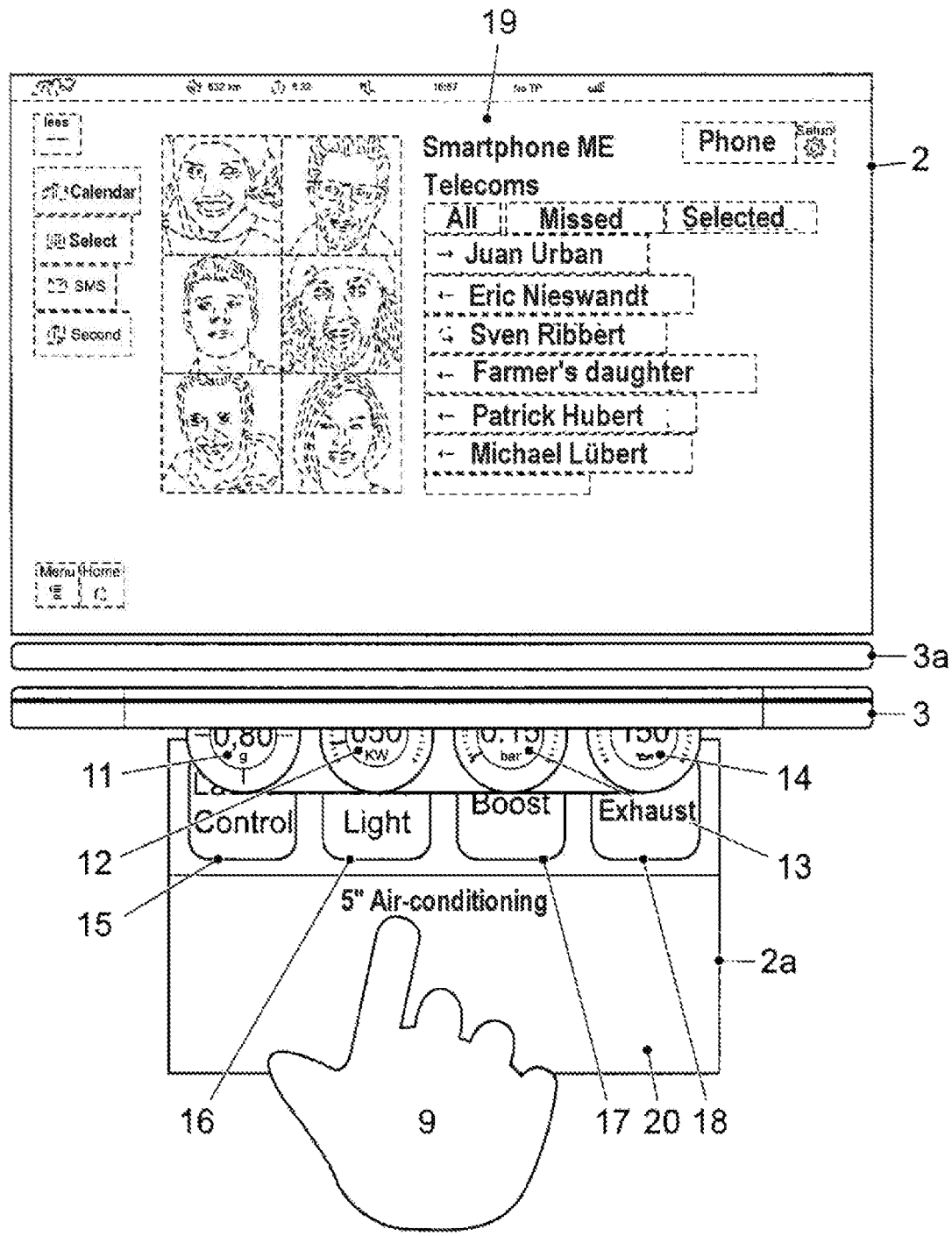
FIG. 5 shows the approaching of a user to a user interface which is an idle mode and is configured according to the present disclosure.

FIG. 5 shows the result of successfully detected approaching of a hand 9 to the infrared LED strip 3a in response to which the primary screen 2 is filled with an unfocused representation of different functional scopes 19. The display elements 11, 12, 13, 14 which were previously represented completely on the screen 2a are shifted in the direction of the primary screen 2, wherein they expose again the operator control elements 15, 16, 17, 18 on the screen 2a. In the course of the reactivation of the primary screen 2, the presentation shown in FIG. 6 is generated.

Figure 6:
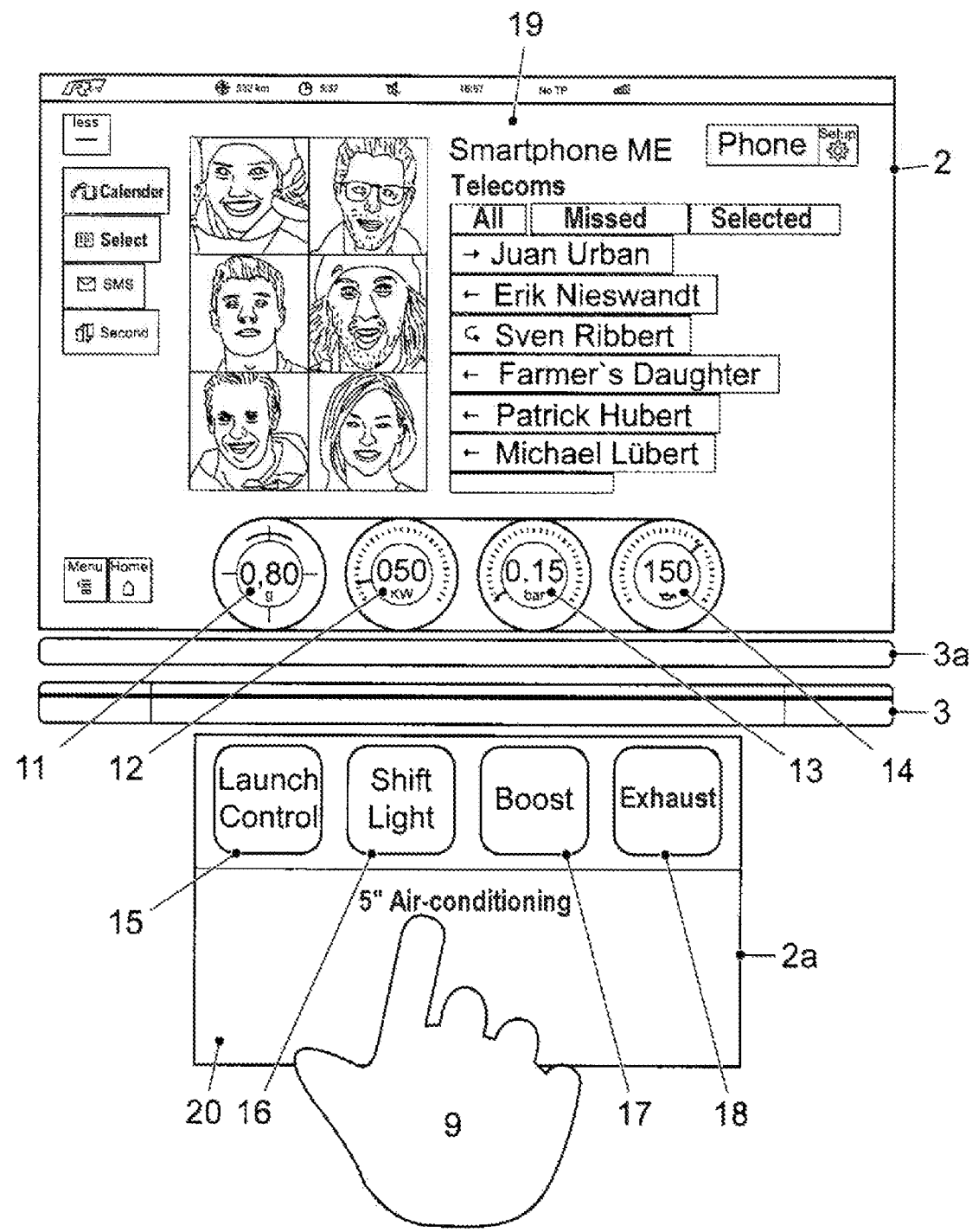
FIG. 6 shows the result of the approach which is illustrated in FIGS. 4 and 5.

In FIG. 6, the screen content 19 is displayed again in a focused fashion and in a lower region the display elements 11, 12, 13, 14 are superimposed on it. The screen 2a then shows again completely the operator control elements 15, 16, 17, 18 and the air-conditioning operator control region 20. A contact-forming input with the user's hand 9 with respect to one of the displayed operator control elements 15, 16, 17, 18 then ensures a corresponding function call again.

Figure 7:
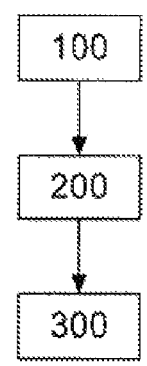
FIG. 7 shows a flow chart illustrating steps for an exemplary embodiment of a method according to the present disclosure.

FIG. 7 shows a flowchart illustrating the steps of a method for hybrid use of a display unit of a transportation means. In step 100, display elements representing a first information scope are displayed on a display unit of a transportation means. In step 200, the approaching of a user to the display unit is detected. This can be done, for example, by using an infrared LED strip. In step 300, operator control elements of a functional scope which does not coincide in terms of content with the information scope of the display elements are displayed instead of the display elements. Instead of perceiving the information scopes of the display elements visually, the user can now control the functional scopes of the operator control elements (for example by means of a contact-forming input on a touch-sensitive surface of the display unit).

Although the aspects according various embodiments have been described in detail on the basis of the exemplary embodiments explained in conjunction with the appended figures in the drawings, modifications and combinations of features of the represented exemplary embodiments are possible for a person skilled in the art without departing from the scope of the present invention the scope of protection of which is defined by the appended claims.

LIST OF REFERENCE NUMBERS

1 User interface
2 Primary screen
2a Screen/display unit
3 Finger strip
3a Approach sensor system
4 Electronic control unit
5 Data memory
6 Loudspeaker
7a, 7b Ambient light strips
8a Driver's seat
8b Front seat passenger's seat
9 User's hand
10 Passenger car
11-14 Display elements
15-18 Operator control elements
Screen content of primary screen
Operator control region for heating/air-conditioning scopes
100 to 300 Method steps
P Arrow

The invention claimed is:

1. A method for the hybrid use of first and second display units of a transportation vehicle, the method comprising the steps of:

displaying display elements representing an information scope on the first display unit, and while the transportation vehicle is in an operating state:
in response to detecting an approach of a user toward the first display unit, automatically displaying operator control elements representing a function scope on the first display unit instead of the display elements and automatically displaying the display elements on the second display unit while the operator control elements are displayed on the first display unit, and automatically removing the display elements from the second display unit and automatically displaying the display elements on the first display unit instead of the operator control elements in response to placing the second display unit in a state of reduced energy consumption, wherein the first display unit is separate and spaced apart from the second display unit, wherein the first display unit is touch-sensitive, and wherein, in contrast to the display elements, the operator control elements are configured to receive user interactions through the first display unit and affect a range of functions represented by the operator control elements.

2. A user interface system for the hybrid use of first and second display units of a transportation vehicle, the user interface system comprising:

the first and second display units, the first display unit being separate and spaced apart from the second display unit, a detection unit which is configured to detect the approach of a user toward the first display unit, and an evaluation unit in communication with the detection unit and the first and second display units, wherein while the transportation vehicle is in an operating state:
the evaluation unit is configured to signal the first display unit to display a plurality of operator control elements representing a functional scope instead of a plurality of display elements representing an information scope in response to receiving a signal from the detection unit indicating the approach of a user toward the first display unit and to signal the second display unit to display the display elements while the operator control elements are displayed on the first display unit, the second display unit is configured to be set in a state of reduced energy consumption, and the evaluation unit is configured to remove the display elements from the second display unit and display the display elements on the first display unit instead of the operator control elements in response to placing the second display unit in the state of reduced energy consumption, wherein the first display unit is touch-sensitive, and wherein, in contrast to the display elements, the operator control elements are configured to receive user interactions through the first display unit and affect a range of functions represented by the operator control elements.

3. The user interface system of claim 2, wherein the information scope of the display elements is different than the functional scope of the operator control elements.

4. The user interface system of claim 2, wherein the display elements are displayed in the manner of individual instruments having an analogue appearance.

5. The user interface system of claim 2, wherein the display elements are assigned to at least one of:
   a compass function,
   a temperature display,
   an acceleration display,
   a charge pressure, and
   a cooling water temperature display.

6. The user interface system of claim 2, wherein the operator control elements are assigned to at least one of:
   an air-conditioning operator control function,
   a seat setting,
   a setting of an exhaust gas system,
   an exhaust training program,
   a transmission program, and
   a lighting function.

7. The user interface system of claim 2, wherein the operator control elements comprise at least one of:
   on/off control buttons,
   incrementation and decrementation control buttons, and
   a slide controller.

8. A computer program product comprising instructions which, when executed on a programmable evaluation unit of a user interface including first and second display units of a transportation vehicle, a detection unit which is configured to detect the approach of a user toward the first display unit, and the evaluation unit which is in communication with the first and second display units and the detector unit, cause the evaluation unit to carry out a method comprising the steps of:
   displaying display elements representing an information scope on the first display unit, and
   while the transportation vehicle is in an operating state:
      in response to detecting an approach of a user toward the first display unit, automatically displaying operator control elements representing a function scope on the first display unit instead of the display elements and automatically displaying the display elements on the second display unit while the operator control elements are displayed on the first display unit, and
      automatically removing the display elements from the second display unit and automatically displaying the display elements on the first display unit instead of the operator control elements in response to placing the second display unit in a state of reduced energy consumption,
   wherein the first display unit is separate and spaced apart from the second display unit,
   wherein the first display unit is touch-sensitive, and
   wherein, in contrast to the display elements, the operator control elements are configured to receive user interactions through the first display unit and affect a range of functions represented by the operator control elements.

9. A transportation vehicle comprising a user interface, the user interface including:
   first and second display units, the first display unit being separate and spaced apart from the second display unit,
   a detection unit which is configured to detect the approach of a user toward the first display unit, and
   an evaluation unit in communication with the detection unit and the first and second display units,
   wherein while the transportation vehicle is in an operating state:
      the evaluation unit is configured to signal the first display unit to display a plurality of operator control elements representing a functional scope instead of a plurality of display elements representing an information scope in response to receiving a signal from the detection unit indicating the approach of a user toward the first display unit and to signal the second display unit to display the display elements while the operator control elements are displayed on the first display unit, and
      the second display unit is configured to be set in a state of reduced energy consumption, and the evaluation unit is configured to remove the display elements from the second display unit and display the display elements on the first display unit instead of the operator control elements in response to placing the second display unit in the state of reduced energy consumption,
   wherein the first display unit is touch-sensitive, and
   wherein, in contrast to the display elements, the operator control elements are configured to receive user interactions through the first display unit and affect a range of functions represented by the operator control elements.

10. The transportation vehicle of claim 9, wherein the information scope of the display elements is different than the functional scope of the operator control elements.

11. The transportation vehicle of claim 9, wherein the display elements are displayed in the manner of individual instruments having an analogue appearance.

12. The transportation vehicle of claim 9, wherein the display elements are assigned to at least one of:
   a compass function,
   a temperature display,
   an acceleration display,
   a charge pressure, and
   a cooling water temperature display.

13. The transportation vehicle of claim 9, wherein the operator control elements are assigned to at least one of:
   an air-conditioning operator control function,
   a seat setting,
   a setting of an exhaust gas system,
   an exhaust training program,
   a transmission program, and
   a lighting function.

14. The transportation vehicle of claim 9, wherein the operator control elements comprise at least one of:
   on/off control buttons,
   incrementation and decrementation control buttons, and
   a slide controller.

* * * * *